US009218739B2

(12) United States Patent
Trombley et al.

(10) Patent No.: US 9,218,739 B2
(45) Date of Patent: Dec. 22, 2015

(54) METHOD FOR ANALYZING TRAFFIC FLOW AT AN INTERSECTION

(75) Inventors: Roger Arnold Trombley, Ann Arbor, MI (US); Alex Maurice Miller, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 13/556,295

(22) Filed: Jul. 24, 2012

(65) Prior Publication Data

US 2013/0304365 A1 Nov. 14, 2013

Related U.S. Application Data

(63) Continuation-in-part of application No. 13/470,461, filed on May 14, 2012, now Pat. No. 8,718,906.

(51) Int. Cl.
*G08G 1/00* (2006.01)
*G01C 21/34* (2006.01)
*G08G 1/0962* (2006.01)
*G08G 1/16* (2006.01)

(52) U.S. Cl.
CPC ............ *G08G 1/09626* (2013.01); *G08G 1/163* (2013.01); *G08G 1/166* (2013.01)

(58) Field of Classification Search
CPC ... G08G 1/09; G08G 1/0962; G08G 1/09626; G08G 1/161; G08G 1/166
USPC ........... 701/117-119, 301; 340/907, 916, 918
See application file for complete search history.

(56) References Cited

U.S. PATENT DOCUMENTS 5,991,692 A * 11/1999 Spencer, II .............. G01P 13/00 701/468
6,292,109 B1 9/2001 Murano et al.
(Continued)

FOREIGN PATENT DOCUMENTS

GB 2405279 A 2/2005

OTHER PUBLICATIONS

Aldridge, Priority to the Right, Apr. 14, 2012, News and information from France, http://www.france-pub.com/forum/2012/04/14/la-priorite-a-droite%E2%80%8E-priority-to-the-right/.*

*Primary Examiner* — Thomas G Black
*Assistant Examiner* — Sara Lewandroski
(74) *Attorney, Agent, or Firm* — Frank A. MacKenzie; Brooks Kushman P.C.

(57) ABSTRACT

A method for assisting a driver includes determining that a host vehicle and first and second surrounding vehicles are approaching an intersection on at least two different road segments; determining when the first and second vehicles have stopped at the intersection; determining when the first and second vehicles proceed through the intersection; and identifying an actual order-of-progression of the first and second vehicles through the intersection. Simultaneously or sequentially with determination of the actual order-of-progression, attempting to determine a present geographic location of the host vehicle and consulting an on-board database to attempt to identify a regulatory order-of-progression for the present geographic location. If the regulatory order-or-progression is identified, the driver is advised regarding the regulatory order-of-progression. If the attempt to identify the regulatory order-or-progression is not successful, the driver is advised regarding the actual order-of-progression.

16 Claims, 3 Drawing Sheets

(56) References Cited

U.S. PATENT DOCUMENTS

| | | | | |
|---|---|---|---|---|
| 6,307,484 | B1 | 10/2001 | Sasaki et al. | |
| 7,639,159 | B2 * | 12/2009 | McNew | G08G 1/164 340/905 |
| 7,647,180 | B2 | 1/2010 | Breed | |
| 7,969,324 | B2 * | 6/2011 | Chevion | G08G 1/164 340/901 |
| 8,027,762 | B2 * | 9/2011 | Otake | B60T 7/22 701/117 |
| 8,362,922 | B2 * | 1/2013 | Kushi | G08G 1/096716 340/436 |
| 8,618,952 | B2 * | 12/2013 | Mochizuki | G08G 1/096783 340/435 |
| 8,639,437 | B2 * | 1/2014 | Caminiti | G08G 1/163 180/275 |
| 8,676,500 | B1 * | 3/2014 | Walsh | G08G 1/09626 370/329 |
| 2002/0036584 | A1 * | 3/2002 | Jocoy | G01S 13/931 342/70 |
| 2004/0102898 | A1 * | 5/2004 | Yokota | G01C 21/3691 701/414 |
| 2005/0174257 | A1 * | 8/2005 | Shankwitz et al. | 340/909 |
| 2005/0209776 | A1 * | 9/2005 | Ogino | G01C 21/3629 701/431 |
| 2008/0125972 | A1 * | 5/2008 | Neff | 701/300 |
| 2008/0162027 | A1 * | 7/2008 | Murphy | B60W 50/14 701/117 |
| 2008/0167821 | A1 * | 7/2008 | Breed | G08G 1/161 701/301 |
| 2009/0109061 | A1 * | 4/2009 | McNew | G08G 1/164 340/928 |
| 2010/0177963 | A1 | 7/2010 | Yokomitsu et al. | |
| 2010/0305858 | A1 * | 12/2010 | Richardson | G06K 9/00785 701/301 |
| 2013/0304364 | A1 * | 11/2013 | Miller | G08G 1/161 701/117 |

* cited by examiner

METHOD FOR ANALYZING TRAFFIC FLOW AT AN INTERSECTION

CROSS-REFERENCE TO RELATED APPLICATIONS

This application is a continuation-in-part of U.S. application Ser. No. 13/470,461, filed May 14, 2012, now U.S. Pat. No. 8,718,906, the disclosure of which is incorporated in its entirety by reference herein.

TECHNICAL FIELD

The present invention relates to a traffic analysis and advisory system to improve safety at roadway intersections.

BACKGROUND

When multiple motor vehicles approach a four-way stop intersection at the same approximate time from different directions, there is often confusion on who has the right-of-way to proceed through the intersection next. This is sometimes exacerbated by a driver of one of the vehicles allowing the others to go, even though they in reality have the legal right away at that moment. This can create a situation, especially on busy roads, where vehicles are delayed longer at the stop than is necessary, thereby impeding the flow of traffic.

This situation can be further exacerbated by someone coming to the stop who is unfamiliar with the right-of-way regulations, or who chooses to ignore them and to proceed out-of-turn through the intersection. If the driver of the vehicle having the right-of-way is not paying enough attention, or has already started to proceed through the intersection themselves, this could lead to a potentially dangerous situation, or a collision.

Systems and methods have been proposed for determining the type of intersection that a host vehicle is approaching, detecting other traffic approaching the same intersection, and determining whether the host vehicle must stop. Others propose a method for monitoring traffic signals to determine if a crossing vehicle is proceeding into the intersection in contravention of the traffic lights indication (i.e. running a red light) and alerting the driver of the host vehicle.

SUMMARY

In a disclosed embodiment, a method for assisting a driver of a host vehicle comprises using a vehicle navigation system to determine a present geographic location of the host vehicle and that the host vehicle is approaching an intersection on a first road segment, determining that a second vehicle is approaching the intersection on a second road segment, accessing a database on-board the host vehicle to identify, with reference to its present geographic location, a location-specific regulatory order-of-progression of vehicles through the intersection, and communicating information related to the regulatory order-of-progression to the driver.

In a further embodiment, communicating the information related to the identified order-of-progression comprises advising the driver whether it is safe to proceed through the intersection.

In another disclosed embodiment, a method for assisting a driver of a host vehicle comprises determining that a host vehicle, a first vehicle, and a second vehicle are approaching an intersection on at least two different road segments; determining when the first and second vehicles have stopped at the intersection; determining when the first and second vehicles proceed through the intersection; and identifying an actual order-of-progression of the first and second vehicles through the intersection. Simultaneously or sequentially with the determination of the actual order-of-progression, the method further comprises attempting to determine a present geographic location of the host vehicle and consulting an on-board database to attempt to identify a regulatory order-of-progression of vehicles through the intersection for the present geographic location. If the attempt to identify the regulatory order-or-progression is successful, the driver is advised whether the regulatory order-of-progression indicates it is the host vehicle's turn to proceed through the intersection. If the attempt to identify the regulatory order-or-progression is not successful, the driver is advised whether the actual order-of-progression indicates it is the host vehicle's turn to proceed through the intersection.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
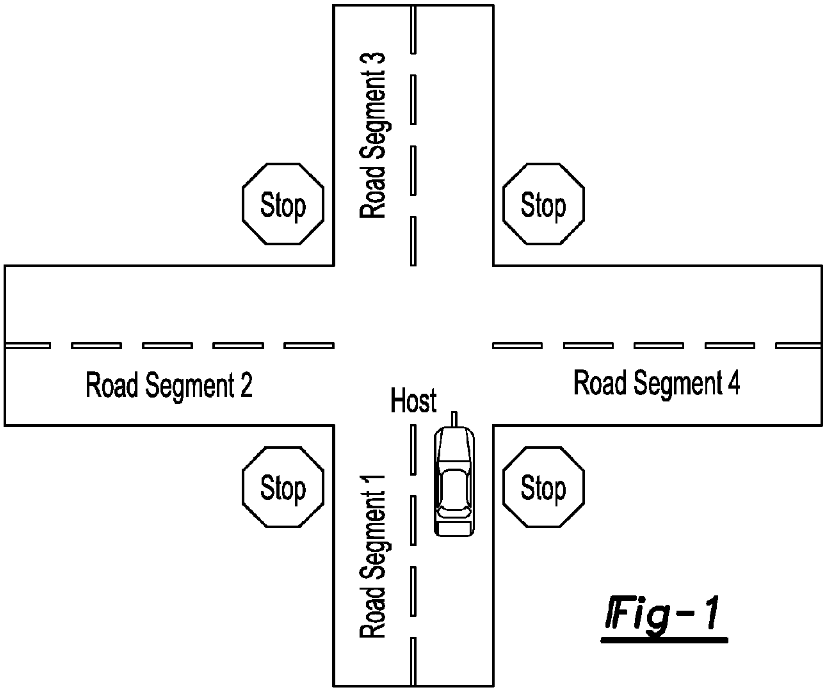
FIG. 1 is a schematic depiction of a four-way stop intersection with a host vehicle stopped.

FIG. 1 shows an example of an intersection layout to which the method disclosed herein may be advantageously applied. The intersection of FIG. 1 has four road segments leading into it. Stop signs, lights, or other appropriate indications are posted at all four of the segments, and hence it is commonly referred to as a four-way-stop intersection. The disclosed method may also be used in relation to an intersection with fewer than or more than four road segments.

For convenience and consistency of description, the road segment are numbered sequentially beginning with "1" for the segment entering the intersection from the bottom of the page (the six o'clock position) and progressing in a clockwise direction around the intersection. Assuming a "North-up" orientation in FIG. 1, Road Segment 1 approaches the intersection on a 000° heading, Segment 2 approaches on a 090° heading, Segment 3 approaches on a 180° heading, and Segment 4 on a 270° heading.

Figure 2:
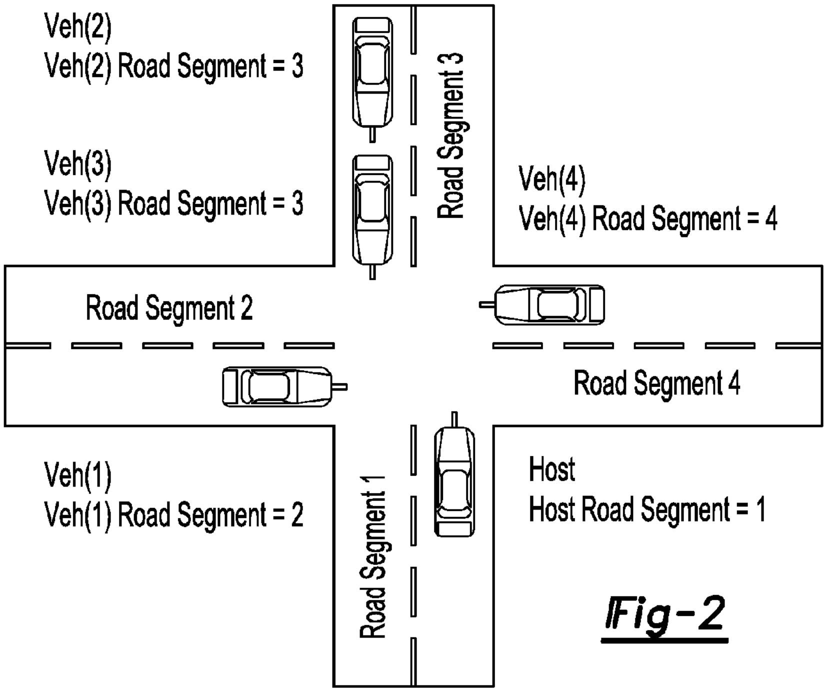
FIG. 2 is a schematic depiction of the intersection of FIG. 1 with four additional vehicles stopped.

FIG. 2 shows a four-way-stop intersection similar to that of FIG. 1 with a host vehicle H approaching the intersection on Road Segment 1 and four other vehicles approaching on the other three segments as shown. For convenience of description, the non-host vehicles are referred to herein as "surrounding vehicles" and are identified a Veh(1) through Veh(4).

Figure 3:
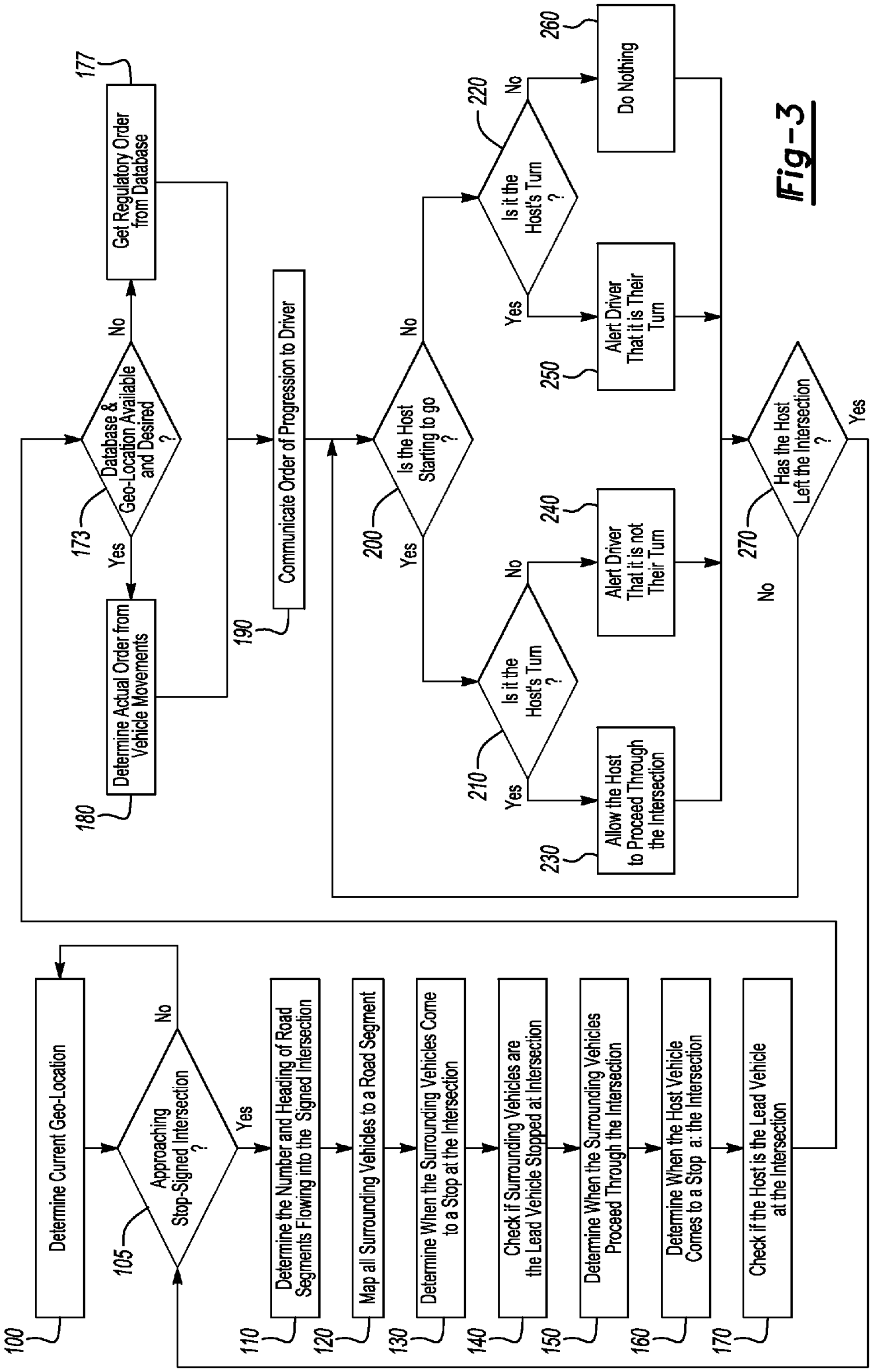
FIG. 3 is a flow chart showing a method for determining an actual order-of-progression and a regulatory order or progression at an intersection.

FIG. 3 is a flowchart showing the steps in a method for assisting a driver of the host vehicle by monitoring the position(s) of surrounding vehicles and applying a known order-of-progression (as dictated by local traffic laws, regulations, or customs) to be followed by vehicles through an intersection. Further, the method includes identifying an actual order-of-progression through an intersection as indicated by the behavior of two or more vehicles other than a host vehicle. This may be desired if, for example, information on a regulatory order-of-progression for the host vehicle's geographic area of operation is unavailable, unreliable, or otherwise not to be used.

In an initial step 100, the current geographic location of the host vehicle is determined. This may be done using a vehicle navigation system that utilizes a satellite-based geolocation system (GPS, Galileo, or GLONASS, for example), as is well known in the art.

At step 105, it is determined that the host vehicle is approaching a three- or four-way stop intersection, and on which road segment the host vehicle is travelling. This may be done using the satellite-based geolocation system in conjunction with a vehicle navigation system that includes a map database which, as is well known in the art, may be carried on-board the vehicle or maintained off-board and accessed by the host vehicle via a wireless communication system.

The disclosed relative order in which many of the steps are performed is, unless dictated by logical or functional considerations, not intended to limit the scope of the present invention. For example, the determination of current geographic location is disclosed as occurring at the initial step 100 primarily because the host vehicle's geolocation/navigation system may be used to perform that step as well as to determine the vehicle is approaching an intersection. But the present invention does not require that those two determinations be performed simultaneously.

In an example of logic that may be used in a method, if the host vehicle is approaching an intersection, a flag is set indicating this:

If $Host_{Range2Int}$<$ApproachRange2Int_{th}$:

then $Approaching_{Signed\_Intersection}=1$;

else $Approaching_{Signed\_Intersection}=0$

Where:

$Host_{Range2Int}$ is the host vehicle's range to an intersection.

$ApproachRange2Int_{th}$ is a range threshold below which the $Approaching_{Signed\_Intersection}$ will be set.

$Approaching_{Signed\_Intersection}$ is a flag indicating whether an intersection is being approached.

Once the above flag is set, the method proceeds to block 110, otherwise remain in step 100 where the host vehicle position and route of travel is monitored.

At step 110, the geographic configuration or layout of the intersection is determined. The layout includes at least the number of road segments feeding into the intersection and the respective orientation or direction of each road segment, conveniently expressed as a compass heading. This information may be obtained from an electronic map database as described above in relation to step 100.

$RoadSegment(1)_{Heading}=x$ $RoadSegment(2)_{Heading}=x$ $RoadSegment(*)_{Heading}=x$ Where:

$RoadSegment(*)_{Heading}$ is the heading of the road segments leading into the intersection.

$RoadSegment(1)_{Heading}$ is the heading of the road segment that the host vehicle is traveling on, and the road segments are assigned numbers sequentially clockwise from there until all road segments have been assigned.

At block 120, all surrounding vehicles are located on ("mapped to") the appropriate road segment entering the intersection. The respective locations and velocities of the surrounding vehicles may be determined if all vehicles are equipped with compatible Vehicle-to-Vehicle (V2V) wireless communication systems. This may be accomplished, for example, according to the logic below, with reference to an intersection and traffic situation such as that as shown in FIG. 2:

For i=1 to NumberofRoadSegments, if $Veh(*)_{Heading}=RoadSegment(i)_{Heading}+/-Heading_{th}$ then $Veh(*)_{RoadSegment}=i$ end Where:

NumberofRoadSegments is the number of road segments entering the intersection as determined by the map database;

$Veh(*)_{Heading}$ is the direction of travel of the surrounding vehicle;

$Heading_{th}$ is a threshold that provides an allowance for slight variations in heading between the vehicles and their respective road segments; and $Veh(*)_{RoadSegment}$ is the road segment on which the surrounding vehicle is currently travelling.

Next, at block 130, it is determined when each of the surrounding vehicles has come to a stop at the intersection. The system may record a time stamp and the heading of each surrounding vehicle when it stops. This may be done by monitoring their velocity using a sensor system carried by the host vehicle H that detects surrounding vehicles, or by means of the V2V communication system referred to above, by which each of the surrounding vehicles broadcasts its position and velocity.

If $Veh(*)_{Velocity}$<$Stopped_{th}$ then $Veh(*)_{Stopped}=1$ else $Veh(*)_{Stopped}=0$ If $Veh(*)_{Stopped(t-1)}=0$ and $Veh(*)_{Stopped(t)}=1$ then $Veh(*)_{StoppedTime}=UTC$ $Veh(*)_{StoppedHeading}=Veh(*)_{Heading}$ Where:

$Stopped_{th}$ is the velocity threshold below which a vehicle is considered stopped;

$Veh(*)_{Velocity}$ is the surrounding vehicle's velocity;

$Veh(*)_{Stopped}$ is a flag indicating whether a surrounding vehicle is stopped or not;

$Veh(*)_{StoppedTime}$ is the time at which the surrounding vehicle came to a stop;

UTC is the current time, which may be expressed in Universal Time Coordinated, the standard reference time used by most GPS-type systems; and $Veh(*)_{StoppedHeading}$ is the heading of the surrounding vehicle when it comes to a stop.

Advancing to block 140, the status of "lead vehicle" is assigned to the surrounding vehicle on each road segment only if it is the first or leading vehicle approaching or stopped on its respective road segment, i.e. the closest to the intersection. The method thus ignores any other vehicles on each road segment that may be approaching or stopped at the intersection but are following or behind another vehicle on the same road segment and therefore are not the "lead vehicle."

If $Veh(*)_{Stopped}=1$ and $|Veh(*)_{Range2Int}|<Range2Int_{th}$ then $Veh(*)_{Lead}=1$ else $Veh(*)_{Lead}=0$ Where:

$Veh(*)_{Range2Int}$ is the surrounding vehicle's range to the intersection;

$Range2Int_{th}$ is a threshold distance value selected to account for a likely distribution of stopping distances to the stop sign given that: a) each vehicle may not stop at the same distance from its respective stop sign; and b) there may be position measurement error (especially for a surrounding vehicle not equipped with V2V communication, and so whose position must be detected by a sensor onboard the host vehicle); and $Veh(*)_{Lead}$ is a flag denoting the surrounding vehicle that is the lead vehicle stopped at the intersection.

At block 150, the time at which the surrounding vehicles leave the intersection is monitored and recorded. To record a timestamp of when each of the vehicles proceeds through the intersection:

If $Veh(*)_{Stopped}=0$ and $Veh(*)_{RangePastInt}>RangePastInt_{th}$ then $Veh(*)_{ProceedTime}=UTC$ Where:

$Veh(*)_{RangePastInt}$ is the negative of $Veh(*)_{Range2Int}$ and represents the distance the front of the vehicle is past the intersection opening;

$RangePastInt_{th}$ is a threshold distance past which a vehicle is considered to have proceeded into the intersection, and takes into account that there is a distribution of distances that a vehicle will pull forward into an intersection before actually proceeding into the intersection; and $Veh(*)_{ProceedTime}$ is the time at which the surrounding vehicle proceeded into the intersection.

At block 160, the host vehicle's velocity is monitored and the time at which it comes to a stop is recorded:

If $Host_{Velocity}<Stopped_{th}$ then $Host_{Stopped}=1$ else $Host_{Stopped}=0$ If $Host_{Stopped(t-1)}=0$ and $Host_{Stopped(t)}=1$ then $Host_{StoppedTime}=UTC$ $Host_{StoppedHeading}=Host_{Heading}$ Where:

$Host_{Stopped}$ is a flag indicating whether a host vehicle is stopped or not;

$Host_{StoppedTime}$ is the time at which the host vehicle came to a stop; and $Host_{StoppedHeading}$ is the heading of the host vehicle when it comes to a stop.

Next, at block 170, a check is performed to determine if the host vehicle is the lead vehicle stopped at the intersection on its road segment. This is done by comparing the range from the host vehicle to the intersection with a threshold distance:

If $Host_{Stopped}=1$ and $|Host_{Range2Int}|<Range2Int_{th}$ then $Host_{Lead}=1$ else $Host_{Lead}=0$ Where:

$Host_{Lead}$ is a flag denoting whether the host vehicle is the lead vehicle stopped at the intersection.

At block 173, a check is made whether it possible and/or desired (by the driver of the host vehicle) to use a database on-board the host vehicle to determine the order-of-progression rules that vehicles in the vehicle's current geographic area are expected to follow when proceeding through a 3-way or 4-way stop-signed intersection. To use the on-board database, valid geolocation information (from step 100) must be available and the database must contain information applicable to the pertinent geographic. The expected order-of-progression, or "right-of-way," for an area is normally dictated by traffic laws, regulations, or customs in force in the area. The database may be part of (or otherwise associated with) the map database used by the vehicle navigation system. In most cases, order-of-progression proceeds in either a clockwise or a counterclockwise direction around the intersection, depending upon the relative times at which the vehicles stop on their respective road segments. Right-of-way rules/regulations/customs are generally set on a country, state, or provincial basis, though this method could also be utilized for any sized locality.

If both valid geographic location and right-of-way information are available, at block 177 the database is accessed or consulted, with reference to the current geographic location of the vehicle, to determine the proper order-of-progression to be followed.

If $GPS_{location}$ and $Local_{rightofway\_regs}$ are available then set Order based on the local right-of-way regulations from the database.

Where:

$GPS_{location}$ is the current geolocation of the vehicle; and $Local_{rightofway\_regs}$ refers to the database of local right-of-way regulations.

If a geolocation is not currently available, or no information on the driving regulations for the current locality is available then the method progresses to block 180. The driver of the host vehicle may be also be given the opportunity to select the block 180 option if desired for any reason.

Figure 4:
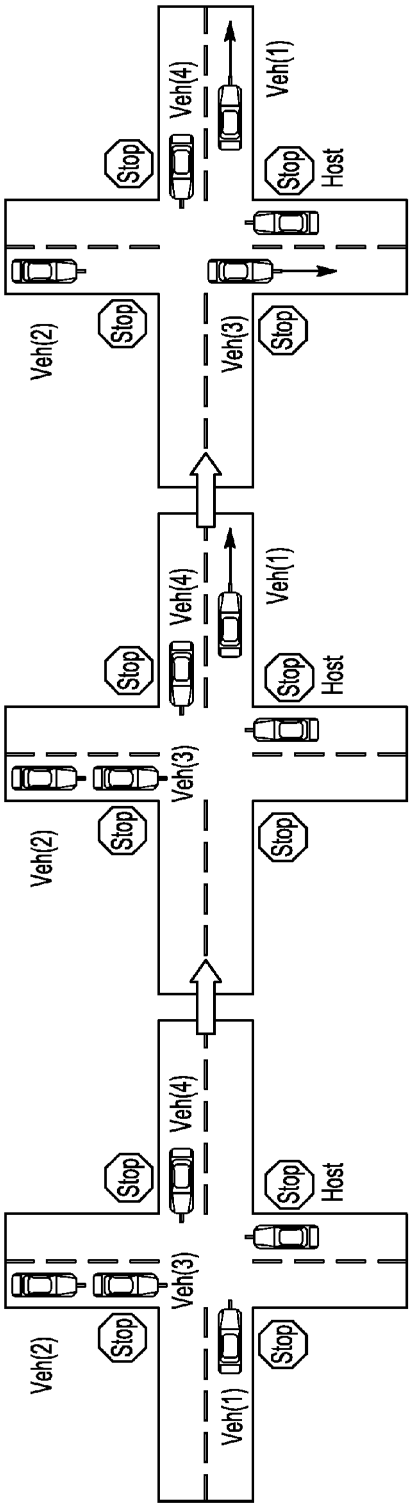
FIG. 4 is a schematic depiction of the progress of vehicles through an intersection.

At block 180, a determination is made as to whether an actual order-of-progression has been established by the surrounding vehicles driving through the intersection. This may be done by referring to the time stamps of when the most recent two surrounding vehicles have proceeded through the intersection. FIG. 4 shows an example of a pattern that indicates a clockwise order-of-progression, since Veh(1) proceeds first through the intersection from Road Segment 2 on a 090° heading, followed by Veh(3) from Road Segment 3 on a 180° heading.

The identity of the road segments of the two most recent vehicle to proceed through the intersection can be found by taking the maximum value of proceed times through the intersection for all of the surrounding vehicles and returning the vehicle numbers of those vehicles:

$(RecentlyProceeded1, RecentlyProceeded2)=\max[Veh(1{:}NumVeh)_{ProceedTime}]$: Return highest two values Then the road segments of these two values can be determined:

$RoadSegment1_{RecentlyProceeded}=Veh(RecentlyProceeded1)_{RoadSegment}$ $RoadSegment2_{RecentlyProceeded}=Veh(RecentlyProceeded2)_{RoadSegment}$ With this information, it may be determined whether or not an actual order-of-progression has been established:

if $RoadSegment1_{RecentlyProceeded}$−$RoadSegment2_{RecentlyProceeded}$=1 then

Order=clockwise else if $RoadSegment1_{RecentlyProceeded}$−$RoadSegment2_{RecentlyProceeded}$=−1

Order=counterclockwise else

Order=none

Where:

RecentlyProceeded1 and RecentlyProceeded2 are the vehicle numbers of the two vehicles that have most recently proceeded through the intersection;

$RoadSegment1_{RecentlyProceeded}$ and $RoadSegment2_{RecentlyProceeded}$ are the road segment numbers from which the two vehicles that most recently proceeded through the intersection entered the intersection; and Order is the order that vehicles are progressing through the intersection. This is either clockwise, counterclockwise, or none if there is no established order.

At block 190, the actual order-of-progression determined at either block 177 or 180 may be communicated to the driver of the host vehicle. This may be done visually using, for example, a screen of a vehicle navigation or multi-function display, and/or audibly by a synthetic or recorded voice announcement. Once informed of the detected order-of-progression, the host vehicle driver may use his/her own judgment to safely follow the order and proceed through the intersection at the correct time. Or, the method may continue past block 190 and, as described below, advise the host vehicle driver as to how to safely proceed.

At block 200, the system determines if the host vehicle is starting to proceed through the intersection. This may be based on whether the host vehicle is currently the lead vehicle and by by checking its current range past the intersection measured from the opening of the intersection:

if $Host_{Lead}$=1 and $Host_{RangePastInt}$>$RangePastInt_{th}$ then $Host_{Proceeding}$=1 else $Host_{Proceeding}$=0

Where:

$Host_{RangePastInt}$ is the negative of $Host_{Range2Int}$ and represents the distance the front of the vehicle is past the intersection opening; and $RangePastInt_{th}$ is a threshold past which a vehicle is considered to have proceeded into the intersection. This threshold should take into account that there is a distribution of distances that a vehicle will pull forward into an intersection before actually proceeding into the intersection.

Whether the result of block 200 is "yes" or "no," the same analysis is applied at block 210 or 220 respectively to determine whether or not it is the host vehicle's turn to proceed:

if Order=clockwise if $RoadSegment1_{RecentlyProceeded}$=NumberofRoadSegments then HostTurn=1: This is because the host vehicle is always on the first road segment.

else

HostTurn=0 else if Order=counterclockwise if $RoadSegment1_{RecentlyProceeded}$−1=1 then

HostTurn=1: This is because the host vehicle is always on the first road segment.

else

HostTurn=0 else if Order=none if $Host_{StoppedTime}$<min($Veh(\mathbf{1}{:}*)_{StoppedTime}$ and $Host_{Lead}$=1 then

HostTurn=1: Host came to a stop first among remaining vehicles.

else

HostTurn=0

Where:

HostTurn is a flag indicating whether it is the host vehicles turn to proceed through the intersection.

After block 210 or 220, information must be presented to the driver based on the current situation. The information provided will depend on the circumstances:

1) If it is the host vehicle's turn to proceed through the intersection and it is already moving, then the host vehicle will be allowed to proceed through the intersection with no alerts or warnings (block 230):

if $Host_{Proceeding}$=1 and HostTurn=1 then

Do nothing because the host vehicle has the right-of-way.

2) If it is not the host vehicle's turn to proceed through the intersection and it is already moving, provide a warning to alert the driver that it is not their turn to proceed. (Block 240) This warning may be auditory, haptic, visual, or any other type of warning effective to alert the driver to the potentially unsafe condition:

if $Host_{Proceeding}$=1 and HostTurn=0 then

Provide a warning that it is not the host vehicle's turn to proceed.

3) If it is the host vehicle's turn to proceed through the intersection and they are not moving, then an alert will be given to let the driver know that it is their turn to proceed through the intersection. (Block 250) This alert can also be auditory, haptic, or visual, but it should be sufficiently different from the warning to alert the driver that it is not their turn to avoid confusion:

if $Host_{Proceeding}$=0 and HostTurn=1 then

Alert host vehicle driver that it is their turn to proceed.

4) If it is not the host vehicle's turn to proceed through the intersection and it is not moving, then no alert is necessary (block 260):

if $Host_{Proceeding}$=0 and HostTurn=0 then

No alert; it is not the host vehicle's turn to proceed and it not proceeding.

At block 270, it is determined if the host has left the intersection or not. This is done by checking the host vehicle's range past the intersection opening and comparing it to range threshold. If the range is greater than this threshold then the host vehicle has left the intersection and the algorithm may be restarted at step 100. If it is less than this threshold, the host vehicle is still at the intersection and the steps 200-270 should be repeated.

if $Host_{RangePastInt}$>$LeftInt_{th}$ then goto step A if $Host_{RangePastInt}$<$LeftInt_{th}$ then goto step J.

Figure 5:
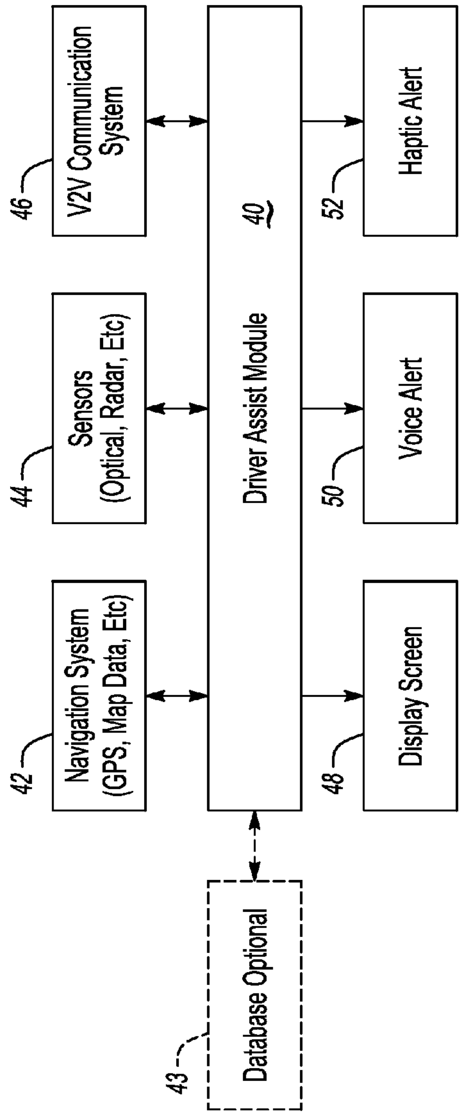
FIG. 5 is a schematic block diagram of a system configured to carry out the present method.

FIG. 5 is a schematic block diagram of an on-board system capable of carrying out the method(s) disclosed herein. A drivers' assist module (DAM) 40 may be microprocessor based such as a computer having a central processing unit, memory (RAM and/or ROM), and associated input and output buses, as is well known in the vehicle electronics field. DAM 40 may be an application-specific integrated circuit or other logic devices known in the art. DAM 40 may be a portion of a central vehicle main control unit, an interactive vehicle dynamics module, a restraints control module, a main safety controller, or may be a stand-alone controller as shown.

DAM 40 receives inputs from a navigation system 42 which may include, for example, a map database (which, as is well known in the art, may be carried on-board the vehicle or maintained off-board and accessed by the host vehicle via a wireless communication system) in conjunction with a satellite-based location system (GPS, Galileo, or GLONASS, for example).

The map database associated with navigation system 42 may include information related to the order-of-progression (right-of-way) rules, regulations, and/or customs appropriate for geographic areas in which the host vehicle is likely to operate. Alternatively, the order-or-progression information may be contained in the DAM 40 or in a separate database 43.

DAM 40 also may receive inputs from sensors 44 which may be used to detect the positions and dynamics of other vehicles in the vicinity using optics, radar, lidar, ultrasonics, and/or other known methods.

DAM 40 also may receive inputs from a Vehicle-to-Vehicle (V2V) communication system 46, as is well known in the art.

DAM 40 uses inputs from the systems as described above to generate information, alerts, and/or advice for the host vehicle driver, and may communicate that data to the driver in any number of ways: Visually using, for example, a display screen 48 such as the type used for driver information; audibly using, for example, a synthetic or recorded voice system; and/or haptically using a haptic alerting system 52 that delivers vibrations or other sensory input to some portion of the driver's body, such as to the hands through the steering wheel (not shown).

The disclosed method determines which vehicle has the right-of-way at an intersection and if it is the host vehicle to prompt the driver to proceed forward. The method also alerts the driver of the host vehicle if it does not have the right away. Additionally, it determines if another vehicle is proceeding out of turn through the intersection and alerts the driver of the host vehicle to wait to proceed through the intersection until it is safe to do so.

If all of the vehicles that are at a four-way (or 3-way) stop intersection are equipped with compatible Vehicle-to-Vehicle Communications systems (V2V) and the host vehicle is equipped with a map data base that provides information on the location of stop signs, then which vehicle came to a stop first at the intersection can be determined. With this information determined, the system is then able to inform the driver of the host vehicle of either a) the order-of-progression directed by regulations or customs at that geographic location or, if necessary or desired, b) the order-of-progression that the preceding vehicles have followed or established. The system may then prompt the driver of the host vehicle to proceed forward when the host vehicle has the right of way (as determined by the determined order-of-progression), and/or alert the driver to stop if the host vehicle is proceeding into the intersection without the right of way.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for assisting a driver of a host vehicle comprising:

using a vehicle navigation system to determine a locality in which the host vehicle is operating, and that the host vehicle is approaching a stop-signed intersection on a first road segment;

determining that a first vehicle and a second vehicle are approaching the intersection on two different road segments;

determining respective stopping times at which the first and second vehicles have stopped at the intersection;

determining respective proceed times at which the first and second vehicles proceed through the intersection;

using a drivers' assistance module, the module capable of identifying both a clockwise order-of-progression and a counter-clockwise order-of-progression based upon analysis of the respective stopping times and proceed times of the first and second vehicles, to identify an actual order-of-progression of the first and second vehicles through the intersection as being either clockwise or counter-clockwise;

consulting an on-board database to attempt to identify a regulatory right-of-way rule applicable to the locality for vehicles passing through the intersection, the regulatory right-of-way rule capable of dictating both a clockwise and a counter-clockwise order-of-progression;

if the attempt to identify the regulatory right-of-way rule is successful, advising the driver whether the regulatory right-of-way rule indicates the host vehicle has right-of-way to proceed through the intersection; and if the attempt to identify the regulatory right-of-way rule is not successful, advising the driver whether the actual order-of-progression indicates the host vehicle has right-of-way to proceed through the intersection.

2. The method of claim 1 wherein information regarding the intersection and road segments entering the intersection is obtained from an on-board map database in conjunction with the vehicle navigation system.

3. The method of claim 1 further comprising identifying one of the vehicles as a lead vehicle on its respective road segment.

4. The method of claim 3 wherein the step of identifying a lead vehicle comprises comparing a distance from the intersection of at least one of the vehicles to a threshold distance value.

5. The method of claim 1 further comprising communicating information related to the identified actual order-of-progression to a driver of the host vehicle.

6. The method of claim 1 wherein the step of detecting when the first and second vehicles have stopped at the intersection comprises comparing a velocity of at least one of the vehicles to a threshold velocity value.

7. The method of claim 1 wherein the step of determining the respective stopping times comprises recording time stamps for each of the vehicles.

8. The method of claim 1 further comprising detecting respective headings of each of the vehicles at their respective stopping times.

9. A method comprising:

using a host vehicle electronic module, identifying an actual order-of-progression of first and second vehicles through an intersection;

using an on-board database, identifying a regulatory right-of-way rule capable of dictating both a clockwise and a counter-clockwise order-of-progression for a current locality; and advising a host vehicle driver of having right-of-way to proceed through the intersection based on the right-of-way rule if indicated in the database, and based on the actual order-of-progression otherwise.

10. The method of claim 9 wherein information regarding the intersection is obtained from an on-board map database in conjunction with a vehicle navigation system.

11. The method of claim 9 further comprising identifying one of the first and second vehicles as a lead vehicle on a respective road segment leading into the intersection.

12. The method of claim 11 wherein the step of identifying a lead vehicle comprises comparing a distance from the intersection of at least one of the vehicles to a threshold distance value.

13. The method of claim 9 further comprising communicating information related to the identified actual order-of-progression to the driver.

14. The method of claim 9 wherein the step of identifying an actual order-of-progression comprises detecting when the first and second vehicles have stopped at the intersection by comparing a velocity of at least one of the vehicles to a threshold velocity value.

15. The method of claim 9 wherein the step of identifying an actual order-of-progression comprises determining recording time stamps for respective stopping times of each of the vehicles.

16. The method of claim 9 further comprising detecting respective headings of each of the vehicles at the intersection.

* * * * *